United States Patent [19]

Montusi

[11] 4,179,273
[45] Dec. 18, 1979

[54] DUAL SCAVENGING SEPARATOR

[75] Inventor: Robert R. Montusi, East Northport, N.Y.

[73] Assignee: Grumman Aerospace Corporation, Bethpage, N.Y.

[21] Appl. No.: 955,259

[22] Filed: Oct. 27, 1978

[51] Int. Cl.² .............................................. B01D 45/16
[52] U.S. Cl. ................................... 55/457; 210/512 R
[58] Field of Search ................. 55/184, 191, 199, 448, 55/452, 456, 457; 210/512 R

[56] References Cited

U.S. PATENT DOCUMENTS

| 806,129 | 12/1905 | Ford | 55/457 |
|---|---|---|---|
| 1,880,185 | 9/1932 | Kerns et al. | 210/512 R X |
| 2,147,671 | 7/1937 | Pratt | 55/457 X |
| 2,664,966 | 1/1954 | Moore | 55/456 X |
| 3,201,919 | 8/1965 | Long | 210/512 R X |

Primary Examiner—Charles N. Hart
Assistant Examiner—Richard W. Burks
Attorney, Agent, or Firm—Bruce B. Brunda; Richard G. Geib

[57] ABSTRACT

A dual scavenging separator is provided which simultaneously scavenges out both clean air and particulates, such as dirt or water, from a contaminated flow medium such as air. The invention may be used in conjunction with aircraft environmental control systems to remove engine bleed air contaminants before the air enters occupied compartments or electronic units.

15 Claims, 4 Drawing Figures

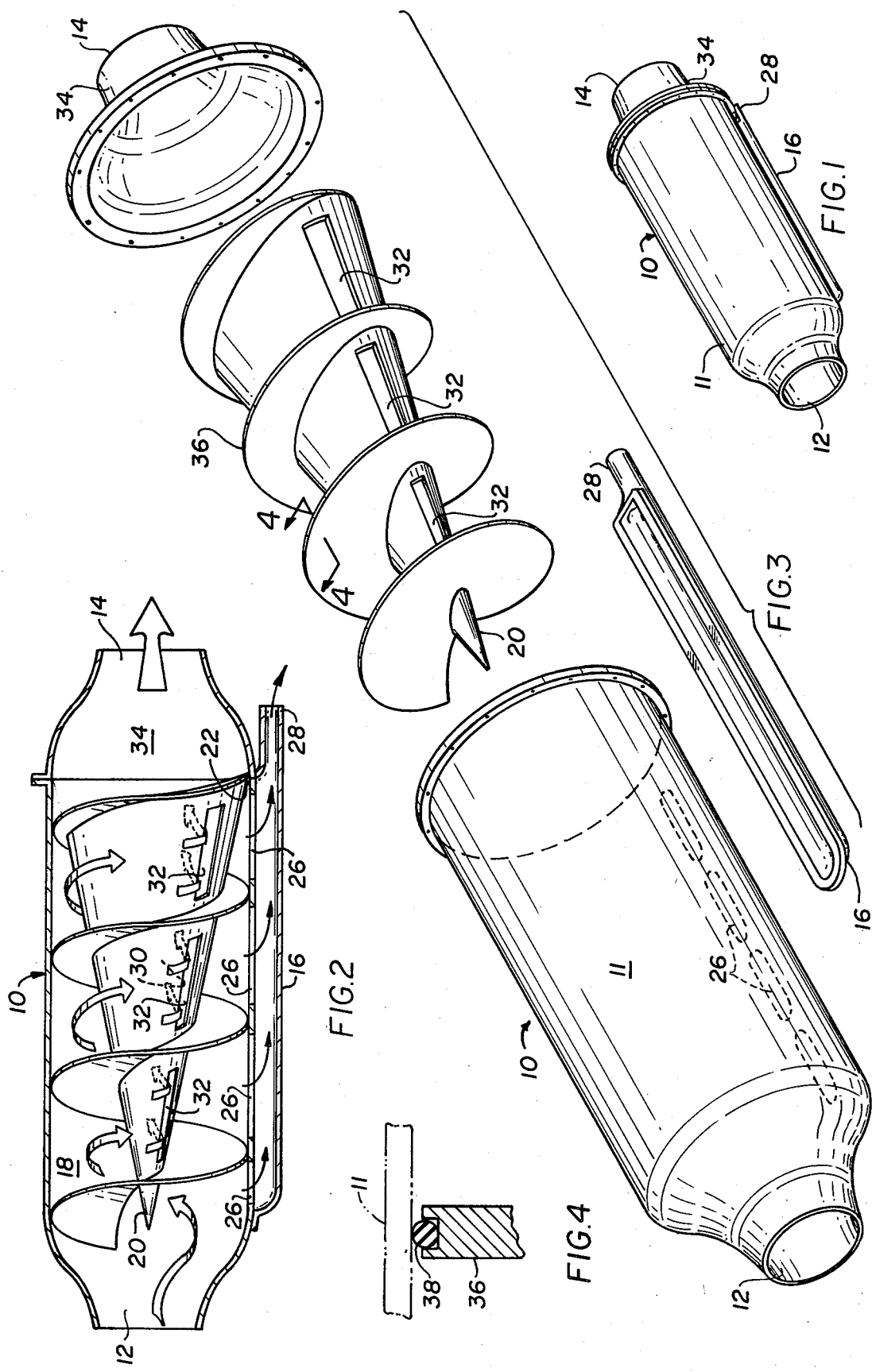

DUAL SCAVENGING SEPARATOR

SUMMARY OF THE INVENTION

This invention relates to fluid filter devices and more particularly to a centrifugal type separator for simultaneously removing scavenged clean air and contaminant components of a fluid stream.

Previous separating devices have been proposed wherein the separation of suspended particles is effected by causing the carrier fluid to flow along one or more curved channels within which the fluid is accelerated and the contaminant particles are hurled by centrifugal force to the outer periphery of the path. Particle collecting means are located about the periphery while the clean scavenged air passes inward to a discharge duct located downstream of the collecting means.

Systems including of this type are shown in U.S. Pat. Nos. 2,413,324, issued to H. T. Holzwarth; and 3,407,575, issued to J. Krizman. Another device also illustrative of this approach is shown in Italian Pat. No. 519,881, issued to C. Otto, et al.

An additional reference is provided in U.S. Pat. No. 3,013,663, issued to Z. Vane. In this device, it is the heavier particle laden fluid which is allowed to pass while the more scavenged fluid is collected through inner separation ducts.

While these above described devices may be suitable for their intended use, they each fail to provide for simultaneously siphoning both the inner scavenged fluid and the outer particule laden fluid from within the fluid accelerating channel. One advantage of this dual separating technique is the resulting enhanced fluid separation occurring at the time of withdrawal. This advantage is a consequence of separating the fluid components as they are being driven, and not afterwards.

It is, therefore, an object of the present invention to provide a fluid scavenging device adapted to simultaneously separate the relatively contaminated and clean components from a fluid stream.

It is also an object of the present invention to provide a fluid scavenging device which utilizes a separating chamber of continuously decreasing cross sectional area in order to squeeze a higher percentage of contaminants from an input fluid.

It is a further object of the invention to provide an efficient and inexpensive scavenging device which does not require external power, moving parts, fans or ejector.

These and other objects and advantages are accomplished in the present invention by providing a fluid separator adapted to receive a pressurized fluid medium, impart a rotary motion to the medium, and simultaneously scavenge both clean and contaminated components from the medium as it is being driven by a fluid turning baffle. The contaminant component of the fluid is allowed to exit the device through apertures in the periphery housing while the scavenged fluid is discharged through openings in a cone-shaped insert forming the inner boundary of the fluid.

The size of the fluid openings, the number of baffle swirls and the diameter of the helical fluid channel may be chosen in accordance with the desired pressure drop between input and output and the required filtering efficiency with consideration to the cost restraints of the given application.

DESCRIPTION OF THE DRAWINGS

FIG. 1 is a perspective view of a device made in accordance with the present invention; and FIG. 2 is a detailed cross-sectional view of the device shown in FIG. 1.

FIG. 3 is an exploded view of the device shown in FIG. 1.

FIG. 4 is a detailed sectional view of a portion of FIG. 3 taken along line 4—4.

DETAILED DESCRIPTION OF THE PREFERRED EMBODIMENT

In FIG. 1, representative fluid separating device 10 is shown wherein a pressurized contaminated air enters housing 11 via air inlet 12. The device imparts rotary motion to the entering fluid thereby segmenting the air into clean and contaminant components.

Clean air is shown exiting the device through air outlet 14, while the contaminants are discharged into sump 16 leading to drain 28.

In FIG. 2, the device 10 is shown in cross-section illustrating the fluid turning and separating technique employed in the present invention.

Air entering the device flows through the unit's internal spiral channel as shown at 18. The channel's inner radius is described by internal cone 20. As the radius of the cone increases, the cross-sectional area of the channel continuously decreases to zero as the air progresses to point 22.

Contaminants in the medium are forced radially to the outer diameter as the air progresses around the internal cone. These contaminants are thereby centrifugally directed into collection sump 16 through housing openings 26. The collection sump is designed to be open to each spiral path for continuous scavenging. Contaminants are allowed to drain out of the sump via an orificed drain line 28.

Simultaneously with the contaminant removal, the clean air traveling close to the center cone is scavenged inward into collection chamber 30 by the internal pressure differential between inlet and outlet openings and through slits 32 in the face of the cone. Clean air enters this chamber from each of the spiral flow paths for continuous scavenging. The scavenged air subsequently exits the device through discharge cap 34.

FIG. 3 illustrates an exploded view of device 10, further demonstrating the relationship of the parts therein. In this embodiment, cone 20 is shown including helical baffle 36 and having a plurality of slots 32. This assembly is insertable within housing 11 and is contained within the housing by cap 34. Sump 16 is shown connectable to housing 11 about housing openings 26.

FIG. 4 is an enlarged sectional view of one portion of helical baffle 36. In order to form a fluid-tight seal between portions of the internal spiral channel 18, baffle 36 is fitted with a gasket member 38 about its external pheriphery. Member 38 therefore contacts the inner surface of housing 11 as well as the outer edge of the baffle 36. The gasket member may be composed of rubber or any synthetic material which will withstand frictional stress of insertion into the housing and still form fluid-tight seals therein.

Some of the advantages of this construction include the elimination of maintenance requirements such as washing a conventional dirt trap. Another advantage is the elimination of an internal pressure relief valve to protect internal parts. Numerous other advantages due to the inherent simplicity of design and absence of moving parts will be apparent to those skilled in the art.

Modifications may be made to the device, including the addition of variable aperture opening devices. The size of the housing, apertures, internal cone, and number of spiral swirls may be selected with regard to the necessary pressure drop and the desired system efficiency.

These and other variations and modifications may be made without departing from the spirit and scope of the present invention which is intended to be limited only by the appended claims.

I claim:

1. A means to separate contaminants from pressure fluid flow while simultaneously scavenging clean fluid from said fluid flow, said means comprising:
   an annular housing having a fluid inlet at one end and open at the other, said housing having openings in a wall thereof extending from adjacent the inlet to the other end;
   a cone insert for said housing for closing said open end, said cone insert having a spiralling baffle thereabout supporting it in said housing, openings through the cone insert communicating the annular housing to the interior of the cone insert, and a fluid outlet for the interior of the cone insert; and
   a sump connected to said annular housing to underlie said openings in the wall thereof, said sump being purged by pressure fluid flow from said annular housing.

2. The structure of claim 1 wherein the cone insert has its apex adjacent the air inlet.

3. The structure of claim 1 wherein the spiralling baffle decreases in radial dimension between the housing and cone insert from the air inlet to the other end of said housing to center the cone insert in the annular housing.

4. The structure of claim 1 wherein said sump has an orifice outlet to enhance scavenging of the sump with the pressure fluid flow from the annular housing.

5. A separator to provide clean, dry fluid from a pressurized source, said separator comprising:
   an annular housing connected to the source;
   a cone insert within the housing having its apex facing the source and its base closing said annular housing to isolate an annular chamber in the annular housing of decreasing cross section from the apex to the base of said cone insert, said cone insert having openings in it to communicate said annular chamber to a conical chamber within said cone insert, said conical chamber of increasing cross section from the apex to the base with a reduced cross section outlet communicable therewith at the base;
   means in said annular chamber to swirl said source through said annular chamber from the apex of the cone insert to its base to radially stratify fluid contaminants including moisture radially outward along the annular housing from non-contaminated, dry fluid presented to the openings in said cone insert; and
   sump means for said annular housing in communication with said annular chamber of decreasing cross section, said annular housing having a plurality of outlets to allow the pressurized source to purge said sump.

6. The structure of claim 5 wherein the means to swirl said source through said annular chamber is a spiral baffle integrated with said cone insert and sealing contact with said annular housing to provide a segregated swirling passageway of decreasing volume within said annular chamber.

7. The structure of claim 6 wherein said cone insert openings are located between portions of said baffle and said housing outlets comprise similarly segregated openings communicating with said sump means such that the simultaneous action of separating clean fluid at the inside of said passageway and the contaminated fluid at the radial extremities of said passageway is maximized.

8. A centrifugal separator for cleaning contaminated fluid comprising:
   an open ended housing of a generally cylindrical construction having inlet and outlet ports;
   a cone shaped hollow insert interposed within said housing such that the apex of said insert is directed toward said inlet port, said cone shaped insert further being in sealing contact with the inner surface of said housing about its base;
   a coiled turning vane mounted on the exterior surface of said cone shaped insert as to impart rotary motion to the fluid flow entering said inlet duct, said turning vane extending radially about said insert and forming sealing contact with the inner surface of said housing, thereby forming a helical channel of progressively decreasing volume;
   a plurality of particulate discharge openings in the wall of said housing, said openings being radially adjacent to said channel and extending substantially the axial length thereof;
   drain conduit means connected to said housing about the exterior of said openings for receiving the flow of particulate contaminated fluid, and
   a plurality of fluid removal ducts in said cone shaped insert for communicating the flow of scavenged fluid from said channel through the interior of said insert and to said fluid outlet port.

9. The apparatus as recited in claim 8 wherein said fluid removal ducts comprise a plurality of slots on the face of said cone insert, each of said slots being confined to a separate portion of said helical channel.

10. The apparatus as recited in claim 8 or 9 wherein the size of said fluid removal ducts is related to the expected fluid input pressure and chosen to produce an optimum efficiency at a desired output pressure.

11. The apparatus as recited in claim 8 or 9 wherein the size of said particulate discharge openings is related to the expected fluid input pressure and chosen to produce an optimum efficiency at a desired output pressure.

12. The apparatus as recited in claim 8 wherein the number of turns of said coiled vane is related to the desired centrifugal separating efficiency.

13. The apparatus as recited in claim 8 wherein the apex of said cone shaped insert is substantially adjacent to said inlet port.

14. The apparatus as recited in claim 8 wherein the interior of said cone shaped insert forms a portion of a collection chamber being further defined by a segment of said housing adjacent to said outlet port and in fluid communication therewith.

15. The apparatus as recited in claim 8 further including sump collection means connected to said drain conduit means, said collection means being adapted to receive the flow of particulate contaminated fluid and collect a quantity of particulate for removal.

* * * * *